May 9, 1933.                P. SBURLINO                1,908,060
                            CASH REGISTER
                        Filed April 30, 1929        2 Sheets-Sheet 1

Inventor
Pascal Sburlino
By Earl Beust
Ralph E. Warfield.
His Attorneys.

May 9, 1933.  P. SBURLINO  1,908,060
CASH REGISTER
Filed April 30, 1929  2 Sheets-Sheet 2
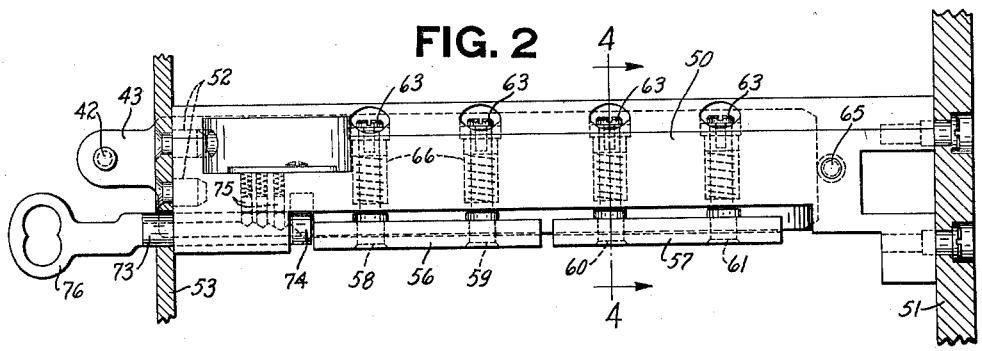
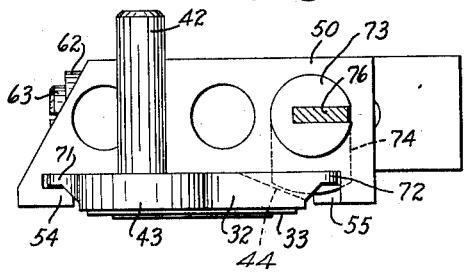
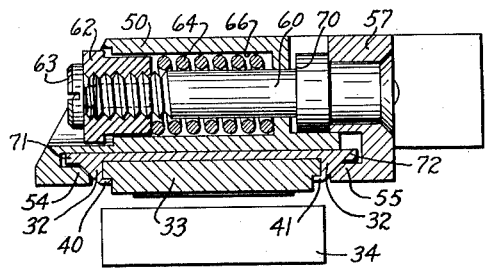
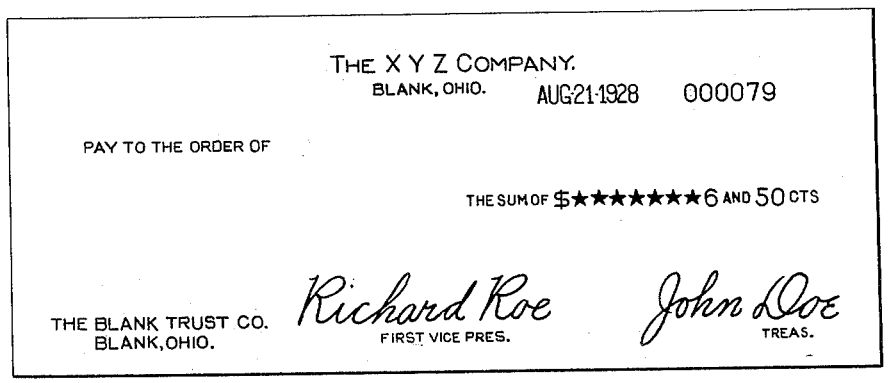
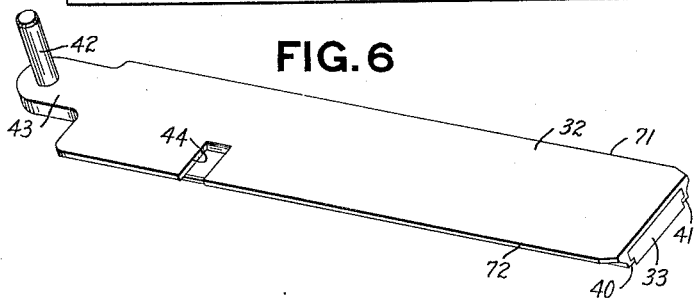
Inventor
Pascal Sburlino
His Attorneys Patented May 9, 1933

1,908,060

UNITED STATES PATENT OFFICE

PASCAL SBURLINO, OF DAYTON, OHIO, ASSIGNOR TO THE NATIONAL CASH REGISTER COMPANY, OF DAYTON, OHIO, A CORPORATION OF MARYLAND

CASH REGISTER

Application filed April 30, 1929. Serial No. 359,391.

This invention relates to improvements in registers, accounting machines and the like, and more particularly to improvements in the printing mechanisms for such machines.

The invention is particularly suited for use in a machine of the general type disclosed in Letters Patent of the United States, Nos. 1,619,796; 1,747,397 and 1,761,542, issued March 1, 1927, Feb. 18, 1930 and June 3, 1930 respectively, to B. M. Shipley, and in application for Letters Patent of the United States, Serial No. 42,458, filed July 9, 1925 by B. M. Shipley.

Several different types of cash registers, accounting machines and check writers now on the market, are adapted to print amounts on bank checks, drafts, etc., and at the time register the amounts represented by the checks, or the like, on various totalizers with which the machines are or may be provided. After the checks are printed and the amounts thereof entered into the totalizer, it is necessary that each individual check be signed, and, as is customary in large corporations under certain circumstances, as, for instance, when preparing dividend checks or profit-sharing checks, the checks or drafts are signed and countersigned by at least two officials of the company. This, of course, requires a great deal of time and occasions not a little labor.

It is, therefore, an object of this invention to provide a cash register or accounting machine with novel means to print signatures in facsimile on a check or draft at the same time the amount and date is printed thereon.

Another object is to provide novel means to removably retain an electric plate in a printing device.

Another object is to provide locking means to prevent removal from or insertion into printing position of an electro by unauthorized persons.

With these and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a full size top plan view of the signature electro support.

Fig. 3 is an enlarged view in front elevation of the signature electro support with the electro slide in printing position.

Fig. 4 is an enlarged sectional view taken on lines 4—4 (Fig. 2).

Fig. 5 illustrates one form of check or draft printed in the machine.

Fig. 6 is a perspective view of the signature electro slide containing the signature electro type plate.

Figure 1:
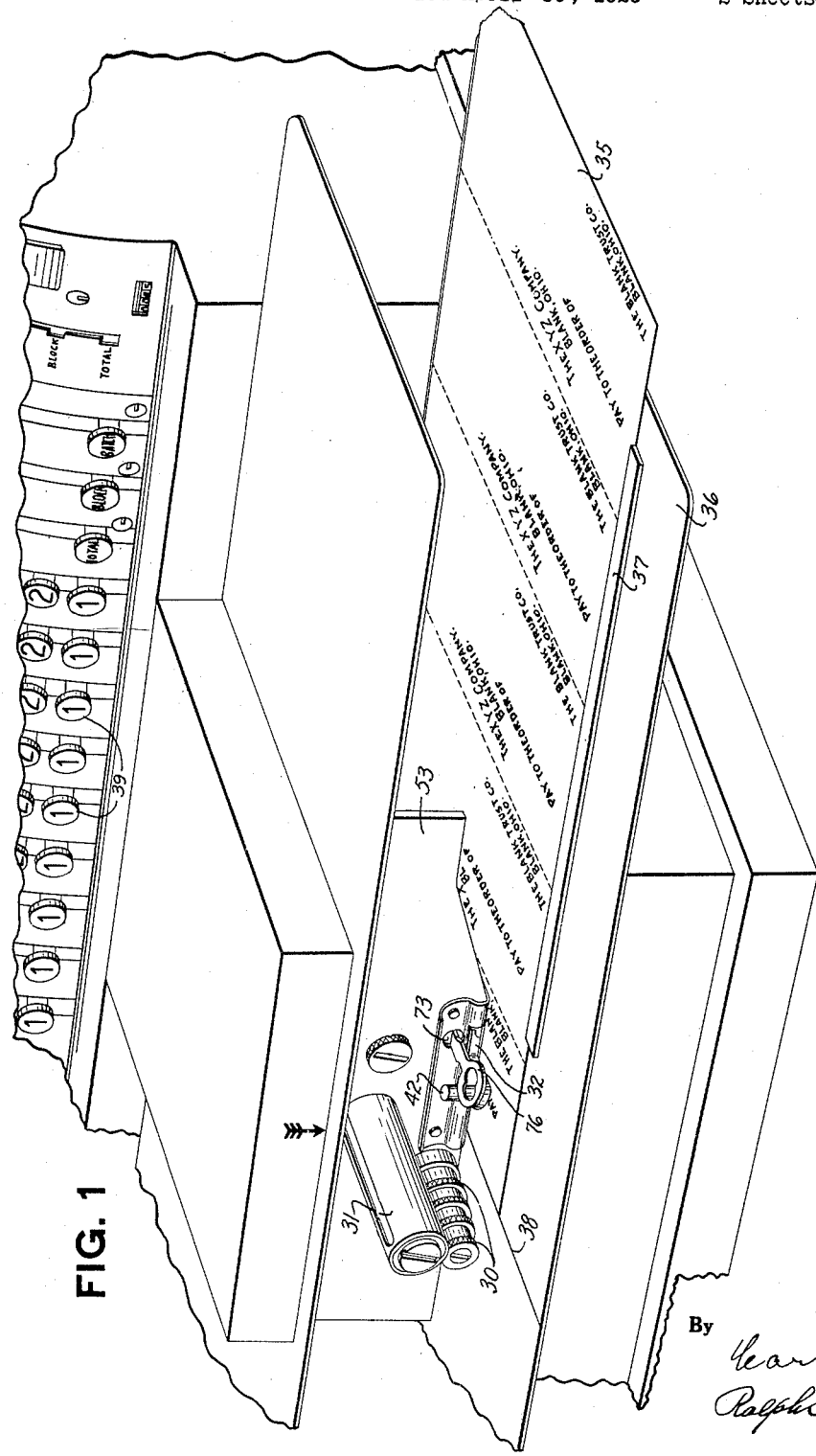
Fig. 1 is a fragmentary perspective view of a portion of a machine, such as is shown in the above-mentioned patents, equipped with a check printing device enclosed in the cabinet of the machine.

The printing mechanism in connection with which the present invention is illustrated, includes, generally, two lines or sets of type carrying elements located preferably in parallelism and in the same horizontal plane, the elements of one of which sets being differentially positioned under the control of the usual manipulative amount keys, to print amounts. The remaining type wheel line comprises two groups of type elements, one group being manually set to print the date, and the units wheel of the other group being automatically advanced one step at each operation of the machine to print a consecutive or serial number. The date and consecutive number are, therefore, printed on the same line.

Knurled knobs 30 (Fig. 1) are provided to manually set the date type wheels (not shown), and a cylinder 31 is provided to manually set the consecutive number type wheels (not shown) either to zero or to any desired number, the cylinder being so constructed, that by drawing it step-by-step towards the front of the machine, it may be made to turn each of the consecutive number type carriers individually.

Individual impression hammers (not shown) are provided to take impressions from the type wheel lines. These hammers are operated in the usual manner, as is fully disclosed in the above-mentioned Shipley Patents Nos. 1,747,397 and 1,761,542.

This invention contemplates the combination with such usual and well known printing mechanism, of a novel means to removably support a printing element in position to be impressed upon the record material.

Preferably, the imprint is made from the removable printing element during the same operation on which the date, consecutive number and amount are printed.

And as one convenient form which this invention may take, it is shown as an electro bearing a facsimile signature or signatures, where more than one is required, for imprint upon a check, draft or similar commercial paper.

Since the imprint of the above data on a check or the like immediately converts it into a medium of exchange, the invention further contemplates efficient safeguards to prevent the unauthorized use of the signature printing means, all of which will be hereinafter referred to, and particularly pointed out in the claims.

As one means to equip a well-known machine with these novel features, there is provided at a point adjacent to and parallel with the alined sets of types above referred to, a heavy bracket or cross bar 50 (Figs. 2-4), the inner end of which is suitably secured to the printer frame 51 of the machine, and the outer end of which is connected by studs 52 to the inner face of the frame 53 concealing and preventing access to the printing mechanism from the front of the machine.

A rigid rail or way 54 is formed along one longitudinal edge of the lower face of the cross bar 50, the co-acting rail or way 55 being formed by suitably grooving the inner faces of a plurality of sectional clamping bars 56 and 57 arranged in alinement with each other along the opposite longitudinal edge of the cross bar.

Studs 58, 59, 60 and 61, the heads of which are fast in the clamping bars 56 and 57, project through reduced openings formed laterally in the supporting cross bar 50 and communicating with horizontally arranged seats 66 in the cross bar. The studs extend longitudinally through their respective seats 66, and are threaded at their free ends to accommodate shouldered collars 62 screwed thereon. Headed screws 63, screwed into holes tapped into the ends of the studs, hold the collars 62 where adjusted. Springs 64 coiled about their respective studs housed in the seats 66, bear at one end against the adjustable collars 62, and at their opposite ends against the bottoms of their respective seats, to draw the sectional clamping bars 56, 57 with their rails 55 towards the fixed rail 54 on the opposite longitudinal edge of the cross bar 50.

A holder in the form of a slide 32 (Figs. 3, 4 and 6) removably supported in the printing mechanism, carries a signature electro type plate 33 against which a platen 34, carried by a hammer (not shown), strikes to take an impression of the facsimile signature therefrom on the check.

In detail the present invention resides in providing an electro type plate readily insertable in and removable from the machine for printing the signature or signatures in facsimile; in the mechanism by which it is removably mounted in the machine, and in the means for locking the electro slide either in or out of the machine.

*Electro slide*

The signature electro 33 comprises the usual electro type plate manufactured in the usual manner.

In the present invention, however, the electro plate is insertable in the channeled holder or slide 32, the side walls of which are equipped with projections 40 and 41 crimped inwardly over shoulders formed on the longitudinal side edges of the electro plate to hold the latter rigidly in the channel. A pin 42 projecting from the upper side of a projection 43 at the outer end of the slide 32, and in line therewith, serves as a handle by which the operator may conveniently insert the electro slide into the printing mechanism of the machine, or withdraw it therefrom. A notch 44 in the electro slide 32 forms a convenient recess into which fits a bolt to prevent removal of the slide from the machine by unauthorized persons, as well as to lock the machine against unauthorized insertion of the electro slide, as hereinafter explained.

The electro holder 32 is supported in the printing mechanism. When the electro holder 32 is inserted endwise into the printing device through a suitable aperture in the front frame 53, the beveled longitudinal side walls of the holder rest on beveled faces formed on the rails or tracks 54 and 55 of the cross-bar 50, and in the sectional clamping bars 56 and 57, respectively, as viewed in Fig. 4. The corners at the inner end of the electro plate holder 32 are chamfered (Fig. 6) to facilitate its insertion between the rails 54 and 55, and as it is inserted, it forces the sectional clamping bars 56 and 57 outwardly.

Due to the lateral pressure of the clamping bars 56 and 57 against the beveled face of the adjacent side flange of the holder which presses the opposite beveled face of the side flange of the slide against the corresponding beveled face of the rail 54, the holder is forced firmly upwardly against the bottom of the bar 50, to hold and align the electro in the proper printing position. A stud 65, projecting downwardly from the cross-bar 50, acts as a stop for the electro 32. When the holder 32 is removed from the cross-bar 50, the springs 64, through studs 58 to 61 inclusive, move the sectional clamping bars 56 and 57 towards the cross-bar 50 until fixed shoulders 70 on the respective studs contact the side edge of the cross-bar to arrest the movement of the clamping bars 56 and 57.

Movement of the clamping bars 56 and 57 towards the right, as viewed in Fig. 4, is limited by the contact of shoulders on the adjustable collars 62 with countersunk shoulders on the cross-bar 50 surrounding the seats 66. Obviously, the extent of movement of the clamping bars 56 and 57 may be varied by adjustment of the collars 62 on their respective studs, the screws 63, of course, being first loosened.

To prevent removal of the electro holder 32 by downward pressure on the outer end or handle thereof, laterally extending fins 71 and 72 formed on the holder, extend over and lie directly above the rails or tracks 54 and 55, respectively.

*Electro slide lock*

As the electro 33 bears the facsimile of the authorized signatures of an official or officials of the company or corporation, it is desirable to lock the electro holder against removal from or insertion into the machine by unauthorized persons. This lock preferably comprises a key barrel 73, (Figs. 2 and 3), rotatively mounted in an opening extending into the outer end of the cross-bar 50. The key barrel 73 carries a lug 74 formed on the inner end thereof and adapted to enter the notch 44 in the electro holder 32 to prevent removal thereof, or in the absence of the slide, to project across the path of the holder to prevent insertion thereof into the machine. The lock is controlled by spring-pressed tumbler pins 75, and is operated by a key 76, insertable in the usual slot in the barrel 73. The lock is so constructed, that before the key 76 can be removed, the barrel 73 must be turned so that the lug 74 is in its locking position.

*Operation*

The checks usually are provided in strips, which are run through the machine, printing the date and the signatures thereon before the individual checks are detached from the strip. With this invention, it requires but one operation of the machine to print the date, consecutive number, amount, and the facsimile signature on each check, the usual procedure being as follows:

A strip of blank checks 35 (Fig. 1) is first placed on a table 36 behind a guide bar 37 with the leading edge of the check strip coinciding with a guide line 38 on the table. The knob or cylinder 31 is rotated to set the desired consecutive number type to the printing position, and the knobs 30 are operated to set the date type wheels to present the correct date to the printing line. The amount for which the first check is to be drawn is then set up on the amount keys 39, and after inspecting the signature electro to see that it is in its proper position, the machine is released for operation by the usual means. During the operation, the amount type wheels are differentially set to position the type corresponding to the depressed amount keys, at the printing line, the hammers are operated to simultaneously take impressions from the date and consecutive number type groups, the set of amount types, and the signature electro type plate. After the impressions are made, mechanism (not shown) operates to feed the check strip toward the left, as viewed in Fig. 1, to bring the next succeeding blank check into position to receive the imprint at the next operation. The amount to be printed on the next check is then set up on the keyboard and the machine operated, and so on, until all of the checks in the strip have been printed, and the amounts for which they were drawn accumulated in the machine. Another strip of blank checks is then placed in the machine, and the operation repeated.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new is:—

1. In a machine of the class described; the combination with a printing electro type plate; and a platen to take impressions therefrom on record material; of a holder for the electro plate; supporting means in the machine in which the holder is removably inserted; and means to prevent unauthorized insertion of the holder into the machine.

2. In a machine of the class described; the combination with a printing electro type plate; and a platen to take impressions therefrom on record material; of a support with which the electro plate is removably connected when in printing position; and means to prevent unauthorized re-insertion of the electro plate into the support after its removal.

3. In a machine of the class described; the combination with an electro plate; and a platen to take impressions therefrom on record material; of a holder in which the electro plate is rigidly fixed; means to yieldingly accommodate the holder; and a lock adapted to prevent unauthorized insertion of the holder into the last-named means after its removal therefrom.

4. In a machine of the class described; the combination with an electro plate; of a holder to which the electro is fixed; a support to accommodate the holder; means to retain the holder in proper position in the support; and a lock to prevent unauthorized insertion and withdrawal of the holder.

5. In a machine of the class described; the combination with an electro-type plate; of a holder therefor; a support for the holder, including a rail on the support; a clamping bar located opposite the rail, and itself having a rail; studs extending from the clamping bar through seats in the support; collars on the studs; and springs in the seats and acting on the studs to press the clamping bar against the holder.

6. In a machine of the class described; the combination with an electro type plate; of a holder therefor; a support for the holder, including a rail on the support; a clamping bar located opposite the rail, and itself having a rail; studs extending from the clamping bar through seats in the support; means on the studs; springs in the seats and cooperating with the means on the studs to press the clamping bar against the holder; and laterally extending fins formed on the holder and extending into recesses directly over the rails to prevent removal of the electro holder by downward pressure on the outer end of the holder.

7. In a machine of the class described; the combination with an electro type plate; of a holder therefor; a support for the holder, including a fixed rail on the support; a yieldingly held clamping bar located opposite the rail, and itself having a rail to support the holder; and fins formed on the holder adapted to extend into recesses directly over the rails to prevent removal of the electro holder by the downward pressure on the holder.

In testimony whereof I affix my signature.

PASCAL SBURLINO.